Oct. 22, 1963 L. L. GRANT 3,108,064
GRAIN FEEDING ATTACHMENT FOR HILLSIDE OPERATION OF A COMBINE
Filed Feb. 20, 1961 2 Sheets-Sheet 1

INVENTOR.
LESLIE L. GRANT
BY Wolfe, Hubbard, Voit & Osann

ATTORNEYS.

Oct. 22, 1963 L. L. GRANT 3,108,064
GRAIN FEEDING ATTACHMENT FOR HILLSIDE OPERATION OF A COMBINE
Filed Feb. 20, 1961 2 Sheets-Sheet 2

INVENTOR.
LESLIE L. GRANT
BY Wolfe, Hubbard, Voit & Osann

ATTORNEYS.

United States Patent Office 3,108,064
Patented Oct. 22, 1963

3,108,064
GRAIN FEEDING ATTACHMENT FOR HILLSIDE
OPERATION OF A COMBINE
Leslie L. Grant, Kilmarnock, Scotland, assignor to Massey-Ferguson (United Kingdom) Limited, Coventry, England, a British company
Filed Feb. 20, 1961, Ser. No. 90,426
1 Claim. (Cl. 209—247)

This invention relates generally to the collecting and cleaning units for handling unclean grain in a combine and more particularly to a novel apparatus for feeding the collected unclean grain to the cleaning assembly.

Harvesting with a combine on a hillside presents the problem that unclean grain from the separating unit, as it is collected and conveyed to the cleaning assembly, tends to slide toward the downhill side of the combine. As a result, the efficiency of the combine cleaning assembly is decreased as those portions of the downhill side of the assembly become overloaded and unclean grain runs over into the tailings instead of being cleaned.

To attempt to maintain an even flow of grain as it is moved to the surface of the cleaning assembly, combines have been provided with longitudinal spacers or baffles fastened transversely to the direction in which the unclean grain tends to slide. Even with the presence of the baffles, there is still a tendency for the grain to form ridges between the baffles, and, with the combine tilted laterally, more grain tends to fall on the downhill side of the collecting and conveying unit and thus become trapped between the baffles on that side. As a result, the bulk of the grain is carried at the downhill side of the collecting and conveying unit and thereby overloads the corresponding part of the cleaning assembly as it is dumped into the latter for the cleaning operation.

Accordingly, it is an object of the present invention to maintain a regulated flow of grain to the cleaning assembly which does not overload any part of the latter even when the combine is sharply tilted to one side or the other. More explicitly, it is an object to provide a grain feeding attachment to push piled up grain away from either side of the combine so as to spread grain from the downhill side of the combine toward the uphill side no matter which way the combine is tilted.

It is a further object of the present invention to provide an inexpensive and simple grain feeding attachment having the above advantages and which is easily adapted for installation on any standard type of combine.

Other objects and advantages of the invention will become apparent upon reading the following detailed description and upon reference to the drawings, in which.

While the invention will be described in connection with a preferred embodiment, it will be understood that I do not intend to limit the invention to that embodiment. On the contrary, I intend to cover all alternatives, modifications and equivalents that may be included within the spirit and scope of the invention as defined by the appended claim.

Figure 1:
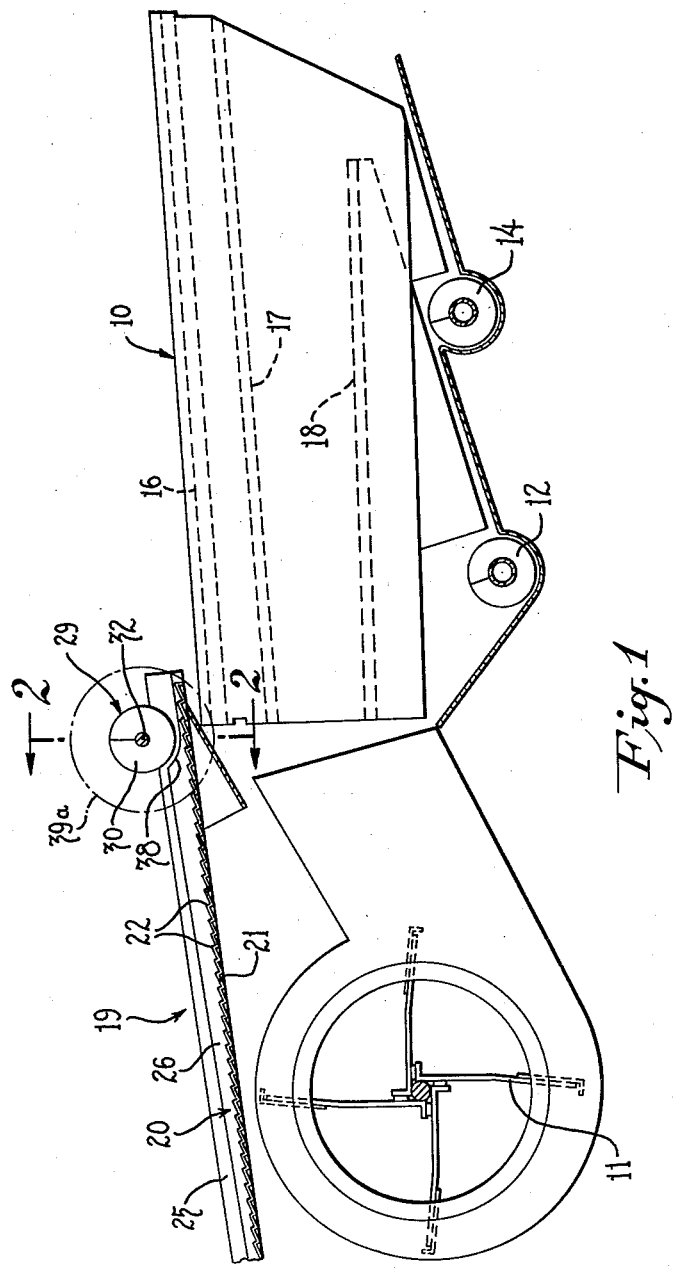
FIGURE 1 is a fragmentary side elevation of a grain collecting and conveying unit in a combine together with the cleaning assembly, and showing an embodiment of the present invention.
Figure 2:
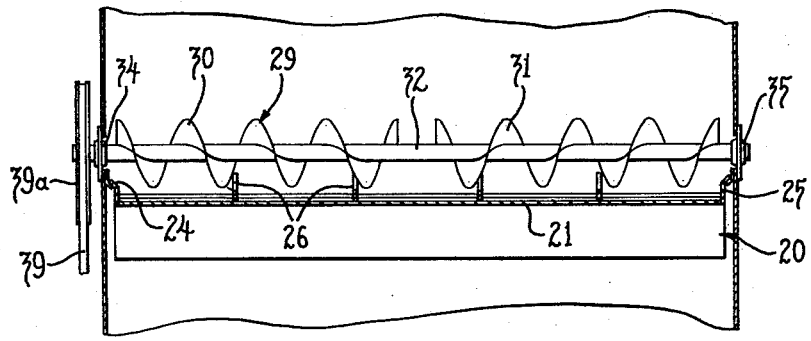
FIG. 2 is a fragmentary section taken approximately along the line 2—2 in FIG. 1.

Turning to the drawings, FIG. 1 shows a combine cleaning assembly 10 adapted to be mounted transversely of a combine and arranged to receive unclean grain and remove straw, chaff, and like refuse material by the usual shaking and air blast action. The air blast for the cleaning action is generated by a fan 11 mounted in the usual relationship with respect to the assembly 10.

For handling the clean grain which has come through the cleaning operation, a clean grain auger 12 is mounted below the assembly to receive and carry the grain to the combine elevator (not shown). Overflow from the cleaning assembly is channeled to a tailings auger 14 for appropriate handling.

As is conventional, the cleaning assembly 10 includes an upper chaffer sieve 16 and a lower chaffer sieve 17, both for removing the bulkier refuse material, and a final cleaning sieve 18 which sifts out the finer refuse material that passes through the sieves 16, 17. The grain is agitated over the sieves, from left to right in FIG. 1, while the air blast from the fan 11 drives the separated refuse back and out of the assembly, as will be understood by those familiar with this art.

The capacity of the cleaning assembly 10 as well as the efficiency of the grain cleaning operation is, of course, determined by the extent to which the total surface area of the sieves 16, 17 and 18 is utilized. If grain is dumped in one area alone, not only is the full capacity of the assembly not being utilized, but the heavy concentration of grain will prevent effective sieving and air blast action. It is therefore desirable to feed grain to the assembly evenly across its full width.

For conveying unclean grain to the cleaning assembly 10, a collector and conveying unit 19 is provided having a grain pan 20 with a bottom portion 21 formed to define a series of steps 22. To contain the collected grain on the steps 22, lateral side pieces 24, 25 and spacers or baffles 26 are secured longitudinally of the grain pan 20 so as to channel the grain toward the assembly 10. Grain is collected on the grain pan 20 from a threshing assembly (not shown) above the unit 19 and then is kicked toward the back of the assembly 10 by the steps 22 as the pan 20 is reciprocated back and forth with a vibratory or shaking action in the usual manner. The cleaning assembly 10 is disposed below the grain pan 20 and thus receives the unclean grain as it spills onto the upper sieve 15. As is conventional, the grain pan 20 is inclined so that the end toward the front of the combine is lower. This subjects the unclean grain to an uphill climb and maintains control over the rate at which the grain is fed.

The spacers or baffles 26 aid in maintaining a properly distributed feed of grain to the cleaning assembly 10. However, as the combine tilts, the grain falls onto the downhill half of the collecting and conveying unit 19, piling up against, and spilling over, the baffles 26 at the lower side of the tilted pan 20 (see FIG. 3).

In accordance with the present invention, the flow of grain to the cleaning assembly 10 is regulated, even during hillside operation, by a pusher 29 which is mounted transversely above the cleaning unit 19 between the side pieces 24, 25 and which distributes piled up grain toward the center of the grain pan 20. In the preferred embodiment, the pusher 29 takes the form of oppositely wound auger flights 30, 31 fixed on a single shaft 32. The shaft 32 is journalled at either end in bearings 34, 35 mounted in the side pieces 24, 25 so as to dispose the auger flights 30, 31 slightly above the grain pan 20 but below the upper edges of the baffles 26. The baffles 26 are relieved at 38 to clear the flights 30, 31. The shaft 32 is rotated so that each flight 30, 31 tends to push grain in contact therewith toward the center of the pan 20. In the illustrated construction, the shaft is driven by a belt 39 that is trained about a pulley 39a on the shaft.

Figure 3:
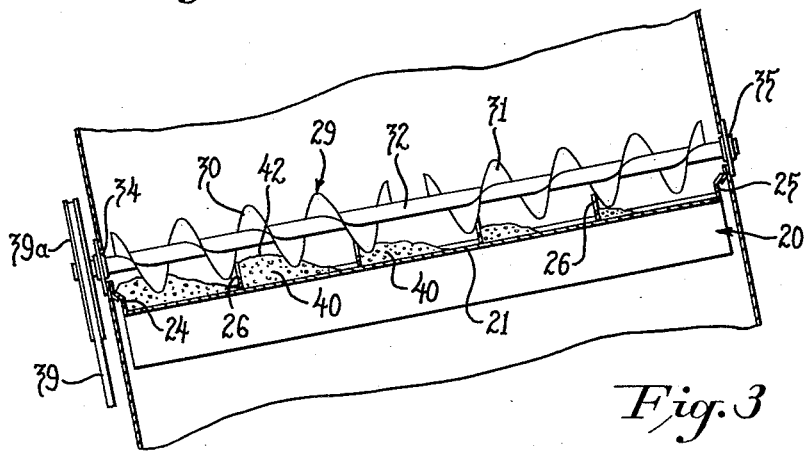
FIG. 3 is similar to FIG. 2 but showing the parts in operation on a hillside.
Figure 4:
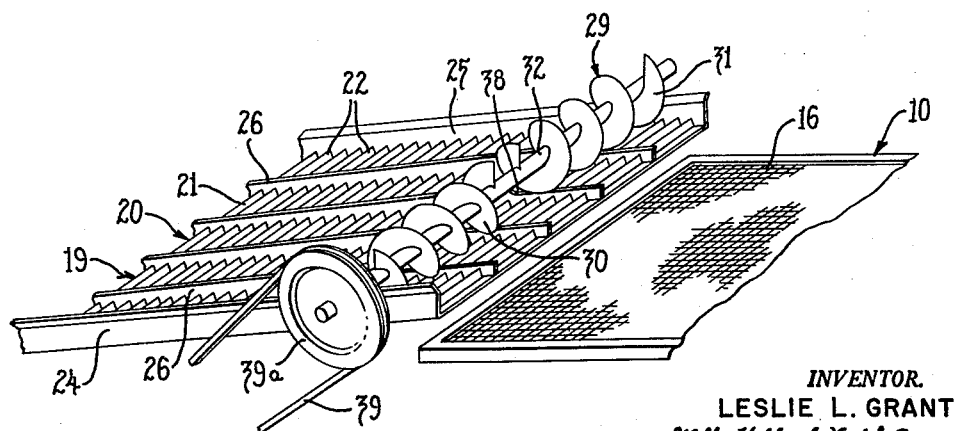
FIG. 4 is a fragmentary perspective of a portion of the assembly shown in FIG. 1.

During hillside operation of the combine, the unclean grain forms in ridges 40, as shown in FIG. 3 and discussed above, with the bulk of the unclean grain on the grain pan 20 collecting at the lower or downhill side of the combine. In this situation, the auger flight 30 extending above the downhill half of the grain pan pushes the crest portions 42 of the grain ridges 40 toward the center of the grain pan. This effectively distributes the heavily concentrated grain over at least one half of the width of the grain pan. When the combine tips to the other side, the flight 31 becomes effective to push the crests of the grain ridges thereby formed.

In either event, no more grain is spilled onto any portion of the assembly 10 than can pass between the flights 30, 31 and the grain pan bottom 22. Grain piled up on the pan 20 to a greater depth is pushed toward the center area where the concentration is less great. The pusher 29 thus regulates the flow of grain to the cleaning assembly, whether the combine is tilted to one side or the other, so as to limit the flow to the capacity of the surface areas of the cleaning assembly 10 receiving the grain. It can therefore be seen that the unclean grain moves onto the cleaning assembly 10 in a fairly uniform stream-flow to assure optimum use of the grain cleaning capacity of the assembly 10. Accordingly, the transverse portions of the cleaning assembly are not overloaded, as the baffles 26 and the pushers 29 cooperate to spread the flow of grain created by the stepped grain pan 20 transversely of the cleaning assembly.

It will be appreciated that the pusher 29 is extremely simple so as to be economical to construct and install. Virtually any standard combine can be readily modified in accordance with the invention at low cost. Because of the simple, one way, rotary drive, little power is required to operate the pusher 29.

I claim as my invention:

In a combine having a grain cleaning assembly extending transversely of the combine with each transverse portion of the assembly having a predetermined grain cleaning capacity, the combination comprising, a grain collecting and conveying unit positioned above said cleaning assembly so as to feed grain thereto and having a plurality of steps, said unit having a central portion and outer lateral edges, a plurality of upstanding baffles fastened to said collecting and conveying unit substantially parallel to said outer lateral edges, said baffles cooperating with said steps for maintaining a series of channelled stream-flows of grain onto the cleaning assembly, a shaft journalled transversely above said unit and extending beyond said edges, first and second oppositely wound auger flights mounted on said shaft so as to extend from opposite ones of said edges toward said central portion, and means for rotating said shaft and thus cause said flights to push grain in contact therewith toward said central portion, the lower edges of said flights passing through relieved portions of said baffles and being spaced above said unit to maintain a stream-flow of grain onto the cleaning assembly within said cleaning capacity of the transverse portions of the cleaning assembly.

References Cited in the file of this patent

UNITED STATES PATENTS

| | | |
|---|---|---|
| 340,498 | Eves | Apr. 20, 1886 |
| 421,975 | Russell | Feb. 25, 1890 |
| 429,616 | Gilson | June 10, 1890 |
| 2,189,706 | Clipston | Feb. 6, 1940 |
| 2,310,610 | Bissell | Feb. 9, 1943 |
| 2,382,965 | Appel | Aug. 21, 1945 |
| 2,893,558 | Zollinger | July 7, 1959 |